US007328446B2

(12) United States Patent
Binnig et al.

(10) Patent No.: US 7,328,446 B2
(45) Date of Patent: Feb. 5, 2008

(54) APPARATUS FOR REDUCING SENSITIVITY OF AN ARTICLE TO MECHANICAL SHOCK

(75) Inventors: Gerd K. Binnig, Wollerau (CH); Walter Haeberle, Waedenswil (CH); Mark A. Lantz, Zurich (CH); Hugo E. Rothuizen, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 10/488,658

(22) PCT Filed: Jul. 19, 2002

(86) PCT No.: PCT/IB02/02865

§ 371 (c)(1),
(2), (4) Date: Jul. 30, 2004

(87) PCT Pub. No.: WO03/021127

PCT Pub. Date: Mar. 13, 2003

(65) Prior Publication Data

US 2004/0245462 A1    Dec. 9, 2004

(30) Foreign Application Priority Data

Sep. 4, 2001    (EP)    ................................. 01121161

(51) Int. Cl.
*G11B 7/08*    (2006.01)
*G01N 23/00*    (2006.01)
*G11B 7/09*    (2006.01)
(52) U.S. Cl. ...................................... 720/688; 250/306
(58) Field of Classification Search ................ 720/688; 250/306
See application file for complete search history.

(56) References Cited

U.S. PATENT DOCUMENTS

| 4,085,825 | A | | 4/1978 | Scarborough |
| 4,309,107 | A | * | 1/1982 | McNair et al. ............. 356/476 |
| 4,403,681 | A | * | 9/1983 | Desjardins ................. 188/379 |
| 5,369,348 | A | * | 11/1994 | Gennesseaux .............. 318/623 |
| 5,381,400 | A | | 1/1995 | Kawagishi et al. |

FOREIGN PATENT DOCUMENTS

JP    08-180623    7/1998

OTHER PUBLICATIONS

"Linear Translation Mechanisms For Nanotechnology Applications", D G Chetwynd, Measurement Control vol. 24,52-55, Mar. 1991.

* cited by examiner

*Primary Examiner*—Angel Castro
*Assistant Examiner*—Christopher R. Magee
(74) *Attorney, Agent, or Firm*—Louis R Herzberg

(57) ABSTRACT

Apparatus for reducing sensitivity of an article to mechanical shock comprises a frame; first and second planar masses mounted in the frame for bi-directional movement relative to the frame along a first axis of displacement; a first lever pivotable about a first fulcrum secured to the frame; the lever having one end connected to the first mass and the other end connected to the second mass, and the fulcrum being disposed between the ends of the lever; whereby the torque exerted about the fulcrum by the first mass is countered by the torque exerted about the fulcrum by the second mass in response to a mechanical shock applied to the frame along the axis of displacement such that an article carried by the first mass in use has reduced sensitivity to the shock.

30 Claims, 9 Drawing Sheets

APPARATUS FOR REDUCING SENSITIVITY OF AN ARTICLE TO MECHANICAL SHOCK

CROSS REFERENCE AND PRIORITY

This application filed under 35 USC 371, is cross-referenced with, and claims priority from, International Patent Application PCT/IB02/02865 filed on Jul. 19, 2002, and published in English with Publication No. WO03/021127 on Mar. 13, 2003, under PCT article 21(2), which in turn claims priority of EP01121161.2, filed on Sep. 4, 2001.

The present invention generally relates to apparatus for reducing sensitivity of an article to mechanical shocks and particularly relates to apparatus for reducing the sensitivity of a local probe storage device to mechanical shocks.

An example of a local probe storage device is described in "The "Millipede"—More than one thousand tips for future AFM data storage". P. Vettiger et al. *IBM Journal of Research and Development*. Vol. 44 No. 3. May 2000. The Millipede device comprises an array of thermal resistance sensor probes. Such arrays may be employed in the detection of the topography of a surface in applications such as surface visualization and data storage. In the data storage application, data recorded in a surface topography may be read by moving a thermal resistance sensor over the surface and detecting changes in thermal conductance between the sensor and the surface as the distance between the sensor and the surface varies. As described in the aforementioned Vettiger et al. reference, the Millipede device comprises a two dimensional array of cantilever sensors fabricated on a silicon substrate. Each cantilever is attached at one end to the substrate. The other end of each cantilever carries a resistive heater element and an outward facing tip. Each cantilever is addressable via row and column conductors. The row and column conductors permit selective passage of electrical current through each cantilever to heat the heating element thereon. In both reading and writing operations, the tips of the array are brought into contact with and moved relative to a storage medium comprising a polymer film storage surface carried on a plane substrate.

Data is written to the storage medium by a combination of applying a local force to the film via each tip and selectively heating each tip via application of data signals through the corresponding row and column conductors to a level sufficient to locally deform the film, leaving an indentation or pit therein.

Each heating element also provides a thermal read back sensor because it has a resistance which is dependent on temperature. For data reading operations, a heating signal is applied sequentially to each row in the array. The heating signal heats all heating elements in the selected row, but now to a temperature which is insufficient to deform the film. The thermal conductance between the heating elements and the surface varies according to distance between the heating elements and the surface. When a tip move into a pit as the array is scanned across the surface, the distances between the associated heating element and the storage medium reduce. The medium between the heating elements and the surface transfers heat between the heating elements and the storage surface. Heat transfer between each heating element and the surface becomes more efficient when the associated tip moves into a pit. The temperature and therefore the resistance of the heating element therefore reduces. Changes in temperature of the continuously heated heating elements of each row can be monitored in parallel, thereby facilitating detection of recorded bits.

A problem associated with such local probe storage devices is that they are sensitive to mechanical shocks causing unwanted displacements of the storage surface relative to the sensor array. Accordingly it would be desirable to reduce such sensitivity in the interests of reliable operation.

In accordance with the present invention, there is now provided apparatus for reducing sensitivity of an article to mechanical shock, the apparatus comprising: a frame; first and second planar masses mounted in the frame for bi-directional movement relative to the frame along a first axis of displacement; a first lever pivotable about a first fulcrum secured to the frame; the lever having one end connected to the first mass and the other end connected to the second mass, and the fulcrum being disposed between the ends of the lever; whereby the torque exerted about the fulcrum by the first mass is countered by the torque exerted about the fulcrum by the second mass in response to a mechanical shock applied to the frame along the axis of displacement such that an article carried by the first mass in use has reduced sensitivity to the shock.

The first and second masses may be coplanar. Alternatively, the first mass may be disposed in a plane parallel to and displaced from the second mass. As such, the first and second masses may at least partially overlap each other.

The second mass preferably comprises an actuator element responsive to input stimulus for moving the second mass relative to the frame along the axis of displacement to produce a corresponding movement of the first mass relative to the frame along the axis of displacement. The actuator element preferably comprises permanent magnet means having an axis of magnetization parallel to the axis of displacement and being cooperative with an electrically conductive coil mounted on the frame for generating a magnetic field coaxial with the axis of magnetization of the permanent magnet means in response to the input stimulus being an electrical current flow in the coil. The permanent magnet means preferably comprises a pair of permanent magnets disposed with like poles facing each other and the coil is disposed between the permanent magnets.

A preferred embodiment of the present invention further comprises: a third mass; the third mass and the first mass being mounted in the frame for bi-directional movement relative to the frame along a second axis of displacement in a plane defined by the frame and orthogonal to the first axis of displacement; a second lever pivotable about a second fulcrum secured to the frame; the second lever having one end connected to the first mass and the other end connected to the third mass, and the second fulcrum being disposed between the ends of the second lever; whereby the torque exerted about the second fulcrum by the first mass is countered by the torque exerted about the second fulcrum by the third mass in response to a mechanical shock applied to the frame along the second axis of displacement.

The first, second, and third masses may be coplanar. Alternatively, the first, second, and third masses may be each disposed in separate parallel planes each spaced from the others. As such, the first, second, and third masses may at least partially overlap each other.

Preferably, the second mass comprises a first actuator element responsive to input stimulus for moving the second mass relative to the frame along the first axis of displacement to produce a corresponding movement of the first mass relative to the frame along the first axis of displacement, and the third mass comprises a second actuator element responsive to input stimulus for moving the third mass relative to the frame along the second axis of displacement to produce a corresponding movement of the first mass relative to the frame along the second axis of displacement. The first actuator element preferably comprises first permanent magnet means having an axis of magnetization parallel to the first axis of displacement and being cooperative with a first electrically conductive coil mounted on the frame for generating a magnetic field coaxial with the axis of magnetization of the first permanent magnet means in response to the input stimulus being an electrical current flow in the first coil, and the second actuator element comprises second permanent magnet means having an axis of magnetization parallel to the second axis of displacement and being cooperative with a second electrically conductive coil mounted on the frame for generating a magnetic field coaxial with the axis of magnetization of the second permanent magnet means in response to the input stimulus being an electrical current flow in the second coil. The first permanent magnet means preferably comprises a pair of first permanent magnets disposed with like poles facing each other and the first coil is disposed between the first permanent magnets, and the second permanent magnet means comprises a pair of second permanent magnets disposed with like poles facing each other and the second coil is disposed between the second permanent magnets, A particularly preferred embodiment of the present invention further comprises: a fourth planar mass mounted in the frame for bi-directional movement relative to the frame along the first axis of displacement; a third lever pivotable about a third fulcrum secured to the frame; a fifth planar mass mounted in the frame for bi-directional movement relative to the frame along the second axis of displacement; and, a fourth lever pivotable about a fourth fulcrum secured to the frame; the third lever having one end connected to the first mass and the other end connected to the fourth mass, and the third fulcrum being disposed between the ends of the third lever; the fourth lever having one end connected to the first mass and the other end connected to the fifth mass, and the fourth fulcrum being disposed between the ends of the fourth lever; whereby the torque exerted about the third fulcrum by the first mass is countered by the torque exerted about the third fulcrum by the fourth mass in response to a mechanical shock applied to the frame along the first axis of displacement; and whereby the torque exerted about the fourth fulcrum by the first mass is countered by the torque exerted about the fourth fulcrum by the fifth mass in response to a mechanical shock applied to the frame along the second axis of displacement.

Preferably, the first, second, third, fourth, and fifth masses are coplanar, the fourth mass being mounted in the frame on the side of the first mass remote from the second mass, and the fifth mass being mounted in the frame on the side of the first mass remote from the third mass. Alternatively, the first, second, third, fourth, and fifth masses may be each disposed in separate parallel planes each spaced from the others. As such, the first, second, third, fourth, and fifth masses may at least partially overlap each other.

As mentioned earlier, the second mass preferably comprises a first actuator element responsive to input stimulus for moving the second mass relative to the frame along the first axis of displacement to produce a corresponding movement of the first mass relative to the frame along the first axis of displacement and the third mass comprises a second actuator element responsive to input stimulus for moving the third mass relative to the frame along the second axis of displacement to produce a corresponding movement of the first mass relative to the frame along the second axis of displacement. Additionally however, in a preferred embodiment of the present invention, the fourth mass comprises a third actuator element responsive to input stimulus for moving the fourth mass relative to the frame along the first axis of displacement to produce a corresponding movement of the first mass relative to the frame along the first axis of displacement and the fifth mass comprises a fourth actuator element responsive to input stimulus for moving the fifth mass relative to the frame along the second axis of displacement to produce a corresponding movement of the first mass relative to the frame along the second axis of displacement. The third actuator element preferably comprises third permanent magnet means having an axis of magnetization parallel to the first axis of displacement and being cooperative with a third electrically conductive coil mounted on the frame for generating a magnetic field coaxial with the axis of magnetization of the third permanent magnet means in response to the input stimulus being an electrical current flow in the third coil, and the fourth actuator element comprises fourth permanent magnet means having an axis of magnetization parallel to the second axis of displacement and being cooperative with a fourth electrically conductive coil mounted on the frame for generating a magnetic field coaxial with the axis of magnetization of the fourth permanent magnet means in response to the input stimulus being an electrical current flow in the fourth coil. The third permanent magnet means preferably comprises a pair of third permanent magnets disposed with like poles facing each other and the third coil is disposed between the third permanent magnets, and the fourth permanent magnet means comprises a pair of fourth permanent magnets disposed with like poles facing each other and the fourth coil is disposed between the fourth permanent magnets.

The present invention also extends to a local probe storage device comprising: a storage surface; at least one probe for reading data from and/or writing data to the surface; a scanner for moving the probe and surface relative to each other to scan the probe across the surface; and apparatus as hereinbefore described coupled to the scanner and one of the storage surface and the or each probe for reducing sensitivity of said one of the storage surface and the or each probe to mechanical shock. The or each probe may be carried by the first mass. Alternatively, the storage surface may be carried by the first mass.

The present invention further extends to a probe imaging system comprising: at least one probe for detecting an image of a surface; a scanner for moving the probe and surface relative to each other to scan the or each probe across the surface; and apparatus as hereinbefore described coupled to the scanner and one of the surface and the or each probe for reducing sensitivity of said one of the surface and the or each probe to mechanical shock. The or each probe may be carried by the first mass. Alternatively, the surface to be imaged is carried by the first mass.

Viewing the present invention from another aspect, there is now provided, a positioning transducer comprising: a shuttle mounted on a frame for movement relative to the frame along an axis of displacement; a pair of permanent magnets mounted on the shuttle with like poles of the magnets facing each other and with respective axes of magnetization of the magnets being coaxial to each other and parallel to the axis of displacement; and a coil mounted on the frame and disposed between the magnets so that shuttle is displaced relative to the frame in response to a current flow in the coil.

Preferred embodiments of the present invention will now be described, by way of example only, with reference to the accompanying drawings, in which.

Figure 1:
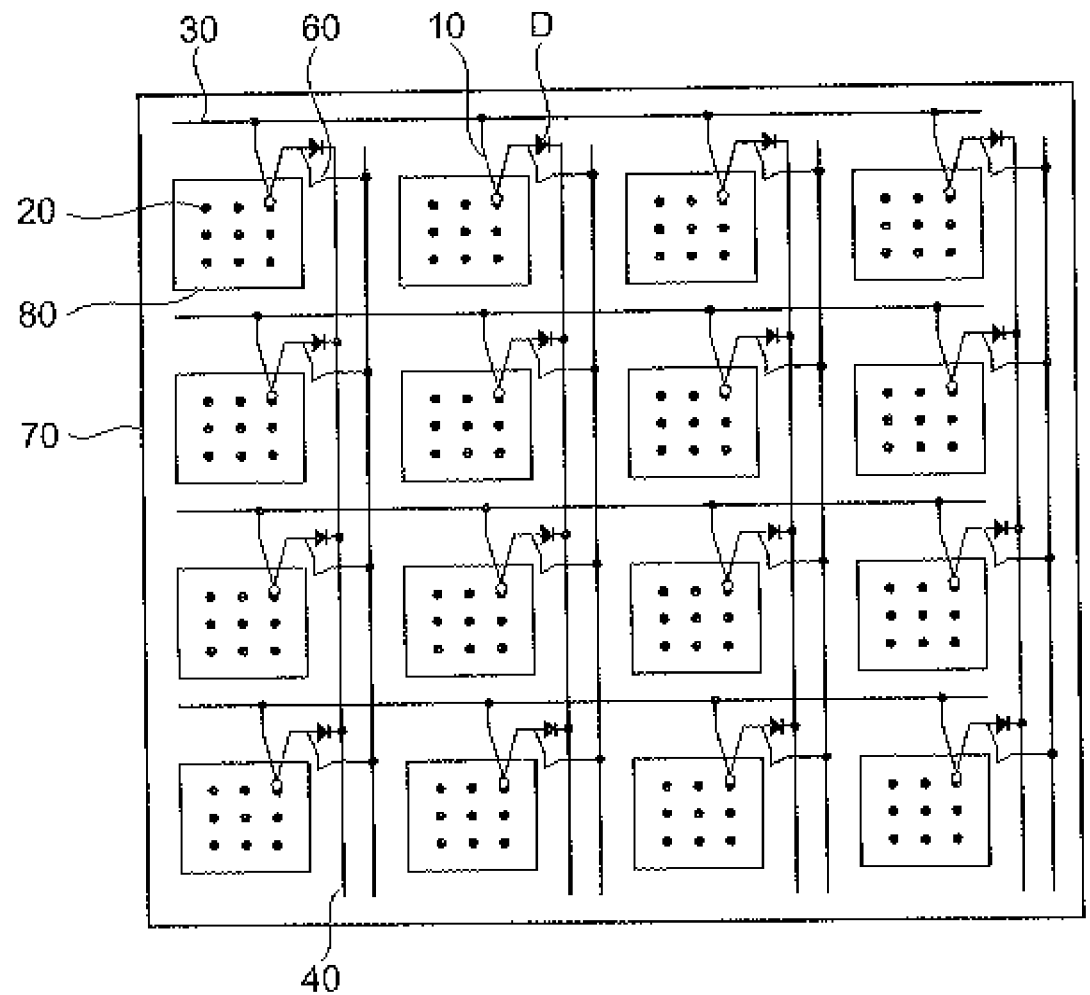
FIG. 1 is a simplified plan view of an example of a local probe storage device.
Figure 2:
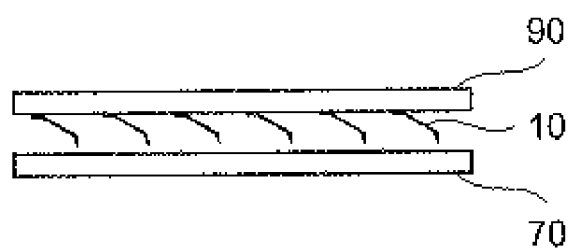
FIG. 2 is a simplified side view of the device.

Referring to FIGS. 1 and 2 in combination, an example of a local probe data storage device comprises a two dimensional array of cantilever sensors 10 disposed on a silicon substrate 90. Row conductors 30 and column conductors 40 are also disposed on the substrate. Each sensor 10 is addressed by a different combination of the row conductors 30 and column conductors 40. There are a pair of column conductors 40 associated with each column of sensors 10 and one row conductor associated with each row of sensors 10. Each sensor 10 comprises a silicon cantilever structure of a length in the region of 70 micrometres and micrometre thickness. Limbs of the cantilever are fixed, at their distal ends, to the substrate 90. The apex of the cantilever has freedom for movement in a direction normal to the substrate 90. The cantilever carries, at its apex, a resistive heater element and a silicon tip facing away from the substrate 90. The limbs of the cantilever are highly doped to provide a conductive current path. The heater element is formed by doping the apex of the cantilever to a lesser extent, thereby introducing a region of increased electrical resistance to current flow through the cantilever. The current path through the cantilever extends between the associated row conductor and the associated column conductors. One of the column conductors is connected to the cantilever via an intermediate diode D. Specifically, the cathode of the diode D is connected to the column conductor. The other column conductor is connected to the cantilever via a drive circuit 60. The anode of the diode D and the input to the drive circuit 60 are connected to the corresponding row conductor via the heater element. The row conductors 30, column conductors 40, diodes D and drivers 60 are also disposed on the substrate 90. The cantilevers are pre-stressed to resiliently bias the tips away from the substrate 90.

In operation, the tip is urged against to a storage surface 70 comprising a planar storage medium in the form of a polymer layer such as a film of polymethylmethacrylate (PMMA) of a thickness in the region of 40 nm. The polymer layer is carried by a silicon substrate.

Data is written to the storage medium by a combination of applying a local force to the storage surface 70 via the tip and heating the tip by passing a write current through the cantilever from the corresponding row conductor 30 to the corresponding column conductor 40. Passage of current through the cantilever causes the heater element to heat up. Heat energy is passed from the heater element into the tip via thermal conductance. The write current is selected to heat the tip to a level sufficient to locally deform the storage surface 70 to leave a pit 20 therein of a diameter in the region of 40 nm. By way of example, it has been found that local deformation of a PMMA film can be achieved by heating the tip to a temperature of the order of 700 degrees centigrade.

The heating element also provides a thermal read back sensor because it has a resistance which is dependent on temperature. For data reading operations, a heating current is passed though the cantilever from the corresponding row conductor 30 to the corresponding column conductor 40. Accordingly, the heating element is again heated, but now to a temperature which is insufficient to deform the storage surface 70. Reading temperatures of the order of 400 degrees centigrade are, for example, insufficient to deform a PMMA film, but nevertheless provide acceptable reading performance. The thermal conductance between the heating element and the storage surface 70 varies according to distance between the heating element and the storage surface 70. When the tip moves into a pit 20 as the array is scanned across the storage surface 70, the distances between the heating element and the storage surface 70 reduce. The medium between the heating element and the storage surface 70 transfers heat between the heating element and the storage surface 70. Heat transfer between the heating element and the storage surface 70 more efficient when the tip moves in the pit 20. The temperature and therefore the resistance of the heating element reduces. Changes in temperature of the continuously heated heating element can be monitored, thereby facilitating detection of recorded bits.

The aforementioned heating current is produced by applying a heating voltage pulse to the corresponding row conductor 30. Accordingly, a heating current flows through each sensor 10 connected to the row conductor 30 to which the heating voltage pulse is applied. All the heating elements in the corresponding row of the array are therefore heated. Recorded data is then read out from in parallel from the heated row of sensors. Each row of the array is thus read sequentially according to a multiplexing scheme.

The array is moveable relative to the storage surface 70 in a plane parallel to the storage surface 70 such that each tip can be scanned over a corresponding field 80 of the storage surface 70. Each field 80 can accommodate a plurality of pits 20. In both reading and writing operations, the tips of the array are moved across the surface of the storage medium 70. In particularly preferred embodiments of the present invention, the array is moveable relative to the storage surface 70 via a pair actuators each acting in a directional orthogonal to the other. In particularly preferred embodiments of the present invention, the actuators comprise electromagnetic drive units. It is desirable for such electromagnetic drive units to provide linearity of motion as a function of drive signal applied and low power consumption.

Figure 3:
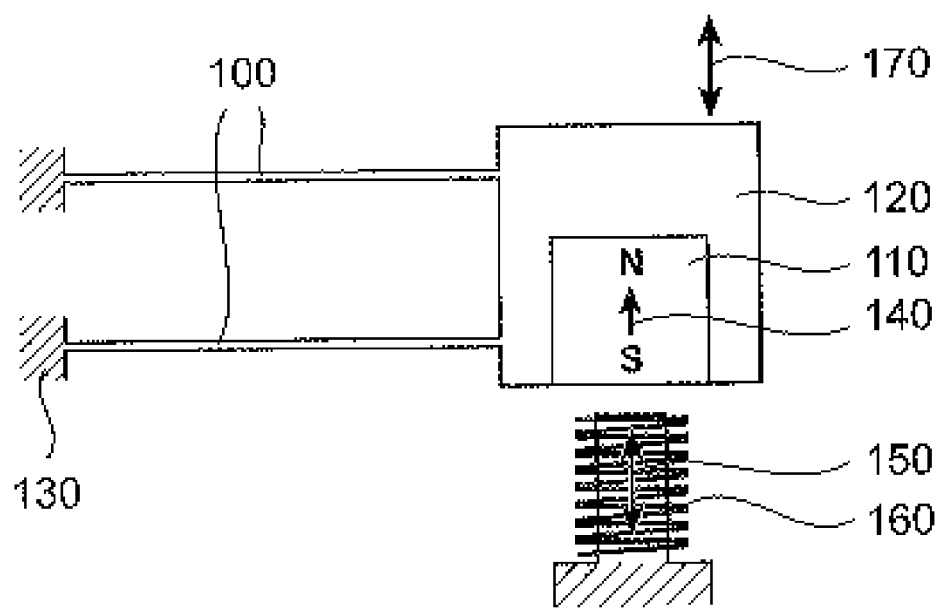
FIG. 3 is a block diagram of an example of an electromagnetic drive unit for the device.
Figure 4:
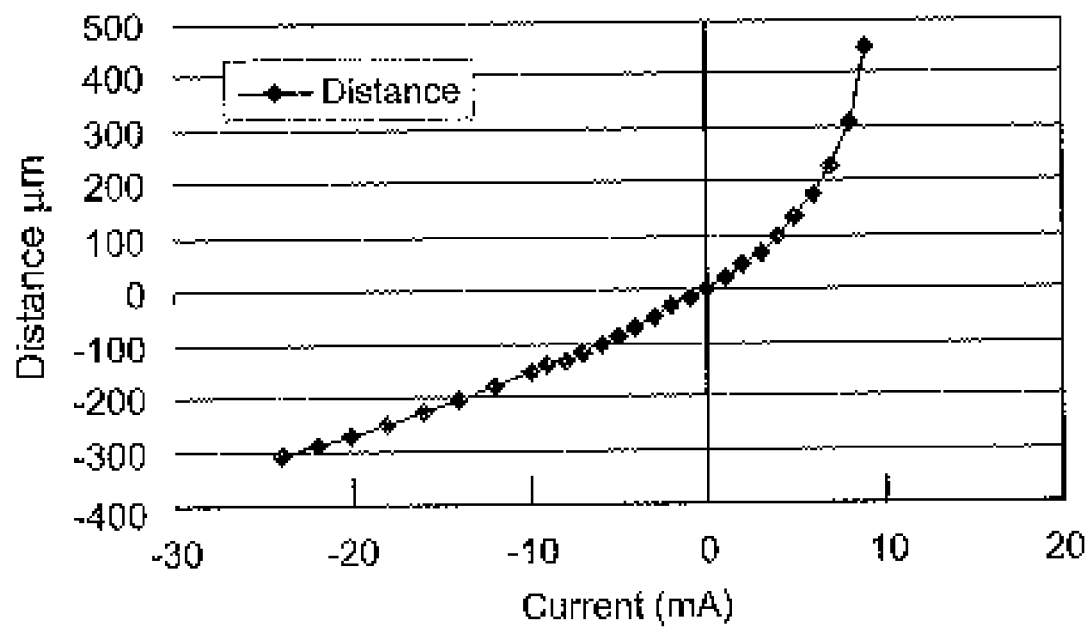
FIG. 4 is a graph of displacement as a function of applied current for the electromagnetic drive unit shown in FIG. 3.

Referring to FIG. 3, an example of a electromagnetic drive unit for a local probe storage device as hereinbefore described comprises a permanent magnet 110 mounted on a shuttle 120 for actuating motion between the storage surface 70 and the substrate 90 carrying the array. The shuttle 120 is mounted on a frame 130 of the device via parallel resilient members 100. The resilient members 100 constrain motion of the shuttle 120 to a plane parallel to the storage surface. Specifically, the resilient members 100 are non compliant for out of plane movement of the shuttle 120. The axis of magnetization 140 of the magnet 110 is coaxial with a magnetic field 150 generated by a coil 160 mounted on the frame 130. Both the magnetic field 150 produced by the coil 160 and the magnetization 140 of the magnet 140 are collinear with the axis of displacement 170 of the shuttle 120. The direction of displacement 170 can be reversed by reversing the direction of current flow in the coil 160. In operation, the force acting on the shuttle 120 for a given current flow in the coil 160 is function of the distance between the coil 160 and the magnet 110. During actuation of the shuttle 120, the distance between the coil 160 and the magnet 110 changes, thereby producing a nonlinear motion relative to current applied to the coil 160. For example, if the shuttle 120 is drawn towards the coil 160, the size of the gap between the magnet 110 and the coil 160 is reduced. The reduction give rise to larger forces and displacements than those present as the shuttle 120 is pushed away from the coil 160. FIG. 4 shows the displacement of such a shuttle 120 relative to current flowing in the coil 160. It will be appreciated that this non linearity in performance is undesirable because it leads a corresponding non linearity in power demand.

Figure 5:
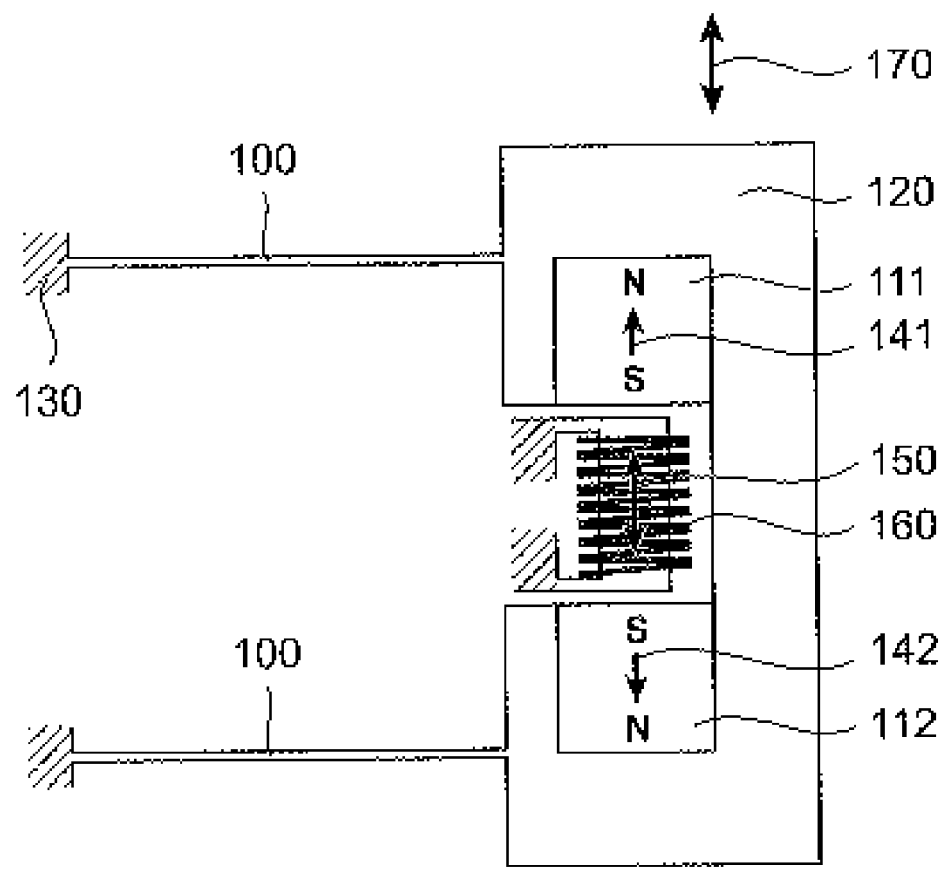
FIG. 5 is a block diagram of another example of an electromagnetic drive unit for the device.

Referring now to FIG. 5, in particularly preferred embodiments of the present invention, the aforementioned non linearity is overcome by mounting a pair of similar permanent magnets 111 and 112 on the shuttle 120 and positioning the coil 160 between them. The magnets 111 and 112 are mounted on the shuttle 120 with their magnetization directions 141 and 142 opposed to each other but remaining coaxial with the direction of magnetic field induced by the coil 160. Again, the coil 160 is mounted on the frame 130. As will be described shortly, in preferred embodiment of the present invention there are two such electromagnetic drive units each operating in a direction orthogonal to the other.

In the interests of minimizing the thickness of the device, it is desirable to arrange the components of the device in a planar manner. A variety of techniques may be employed for achieving such an objective, including planar batch fabrication, injection molding, and hot embossing. Based on such techniques, the frame 130 may be fabricated from any of a range of different materials such as silicon, metals, or plastics such as photo plastics. The magnets 111 and 112 and coils 130 may be embedded in the thickness of the device. This has the advantage of minimizing forces and torques acting out of the plane of the device.

Figure 6:
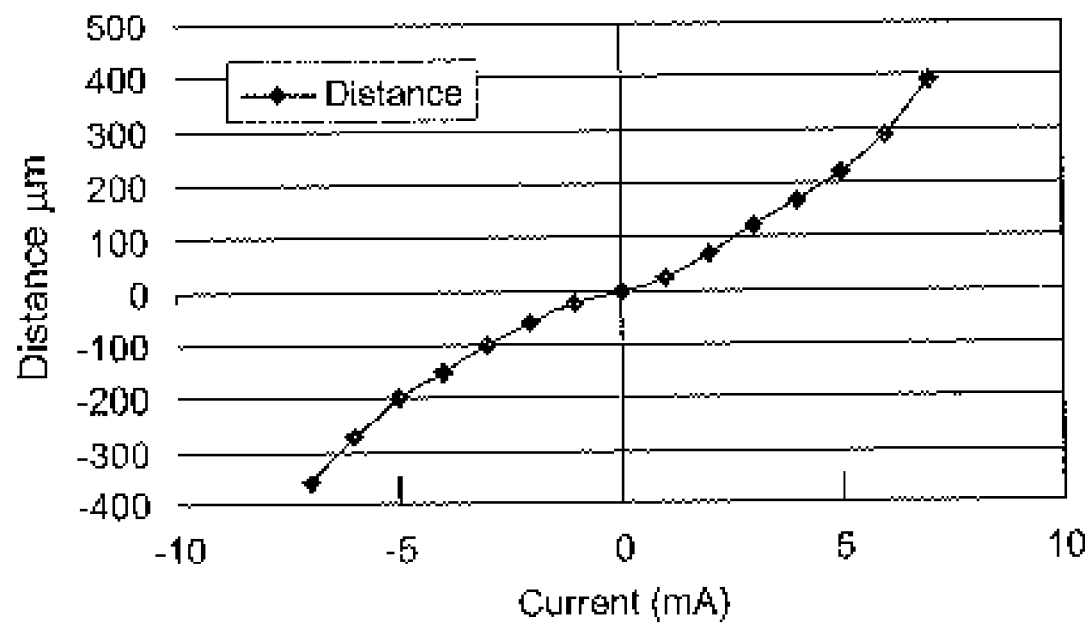
FIG. 6 is a graph of displacement as a function of applied current for the electromagnetic drive unit shown in FIG. 5.
Figure 7:
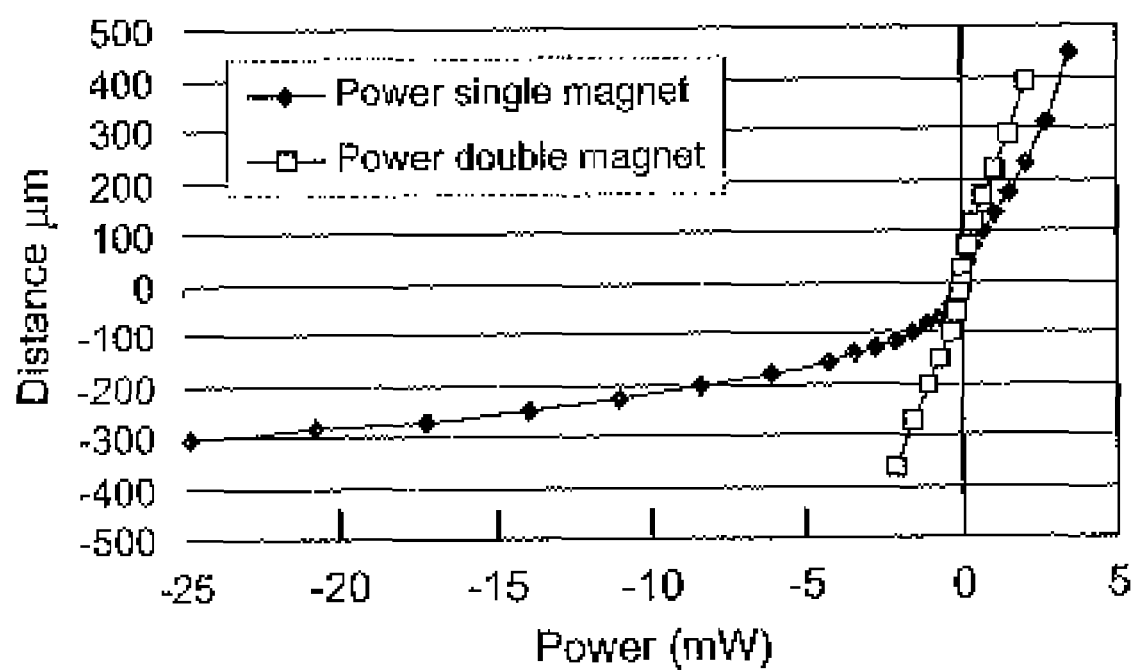
FIG. 7 is a graph of displacement as a function of power for the electromagnetic drive units shown in FIGS. 3 and 5.

In operation, when a current is passed through the coil 130, one of the magnets 111 and 112 is attracted towards the coil 130 and the other of the magnetic 111 and 112 is repelled from the coil 130, thereby producing a displacement of the shuttle 120. When the shuttle 120 is displaced by application of current to the coil 130, the increase in attractive force as the gap between the coil 130 and the attracted one of the magnets 111 and 112 is decreased is balanced by the decrease in repulsive force resulting from the increased distance between the repulsed one of the magnets 111 and 112 and the coil 130. The arrangement is symmetric so that if the current in the coil 130 is reversed the equivalent magnitude of force and displacement are generated in the opposite direction. FIG. 6 shows the displacement of such an arrangement as function of current applied to the coil 130. Referring to FIG. 7, an additional advantage of such arrangements is that the power required to attain a given displacement is significantly reduced in comparison with the aforementioned single magnet implementation.

Figure 8:
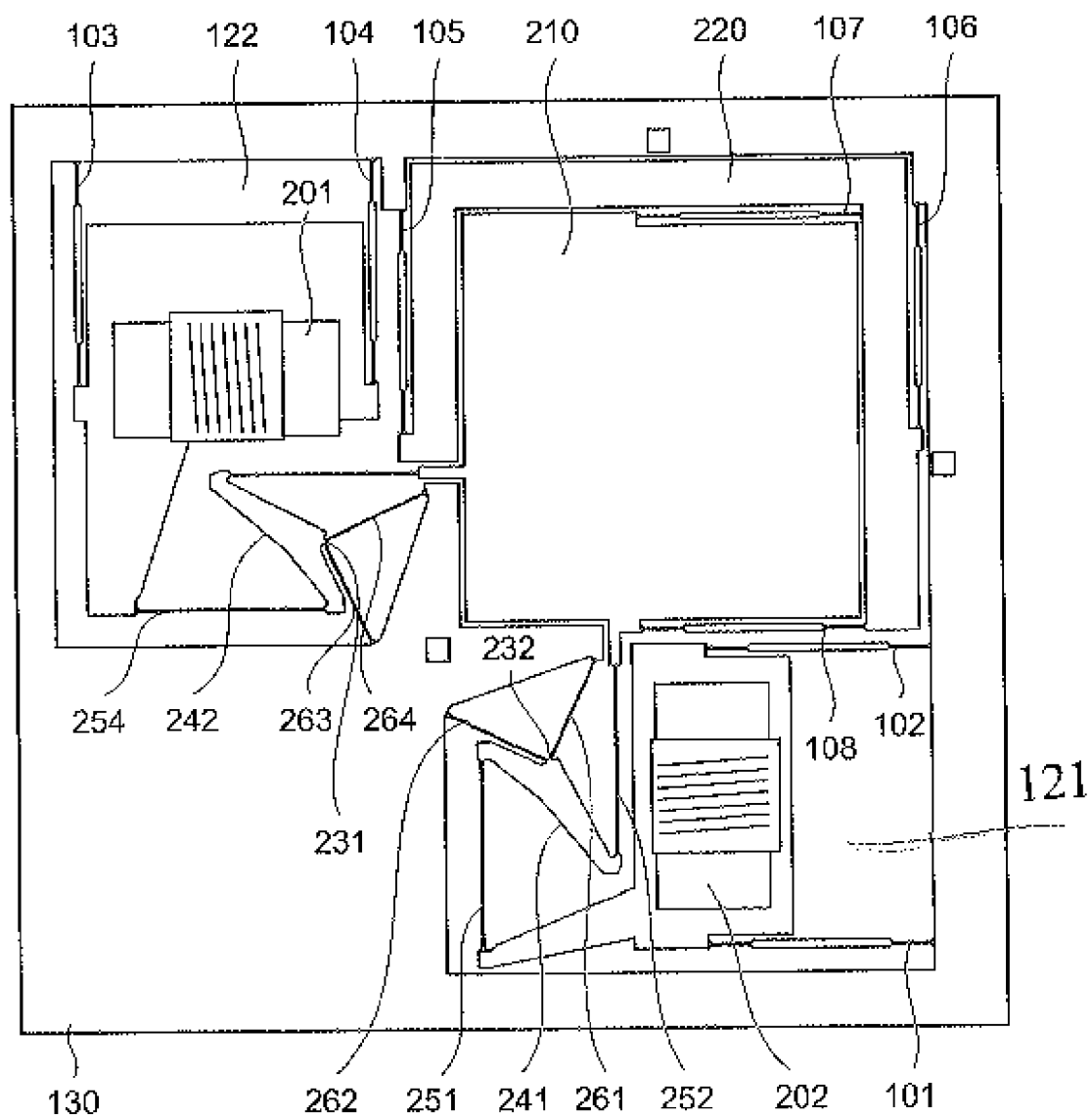
FIG. 8 is a plan view of part of an example of a local probe storage device embodying the present invention.

Referring now to FIG. 8, in a preferred embodiment of the present invention, there is provided two shuttles 121 and 122.

Shuttle 121 is connected to the frame 130 via a pair of parallel members 101 and 102. Similarly, shuttle 122 is connected to the frame via a pair of parallel flexible, members 103 and 104. In operation, members 101 and 102 permit translational movement of shuttle 121 relative to the frame 130 against a resilient bias in a plane defined by the frame 130 along an axis parallel to the plane defined by the frame 130. Specifically, members 101 and 102 are flexible for movement in the plane defined by the frame 130 but inflexible in directions extending out of the plane defined by the frame 130 so that movement of shuttle 121 out of the plane defined by the frame 130 is inhibited. In the interests of simplicity of explanation herein, the axis of permitted movement of the shuttle 121 relative to the frame 130 will hereinafter be referred to as the y axis. The resilient bias imposed by members 101 and 102 acts against movement of shuttle 121 relative to the frame 130 in either direction along the y axis such that shuttle 121 is biased into an equilibrium position central to a range of travel defined within the frame 130. The permanent magnet component of an electromagnetic drive unit 202 as hereinbefore described in mounted on shuttle 121. The coil of the drive unit 202 is mounted on the frame 130. In operation, the drive unit 202 is actuated by supply of a current flow in the coil to move shuttle 121 against the bias imposed by the members 101 and 102 along the y axis. The movement can be in either direction depending on the direction of current flow in the coil.

Similarly, members 103 and 104 in operation permit transitional movement of shuttle 122 relative to the frame 130 against a resilient bias in a plane defined by the frame 130 along an axis parallel to the plane defined by the frame 130. However, the axis of permitted movement of the shuttle 122 is orthogonal to that of shuttle 121. Members 103 and 104 are flexible for movement in the plane defined by the frame 130 but inflexible in directions extending out of the plane defined by the frame 130 so that movement of shuttle 122 out of the plane defined by the frame 130 is inhibited. In the interests of simplicity of explanation herein, the axis of permitted movement of the shuttle 122 relative to the frame 130 will hereinafter be referred to as the x axis. The bias imposed by members 103 and 104 acts against movement of shuttle 122 relative to the frame 130 in either direction along the x axis such that shuttle 122 is biased into an equilibrium position central to a range of travel defined within the frame 130. The permanent magnet component of an electromagnetic drive unit 201 as hereinbefore described in mounted on shuttle 122. The coil of the drive unit 201 is mounted on the frame 130. In operation, the drive unit 201 is actuated by supply of a current flow in the coil to move shuttle 122 against the bias imposed by members 103 and 104 along the x axis. Again, the movement can be in either direction depending on the direction of current flow in the coil. The coils are not shown in FIG. 8.

A substrate 210 carrying the storage surface 70 is connected to the frame 130 via a yoke 220. The frame 130, substrate 210 and yoke 220 are substantially coplanar. The yoke 220 is secured to the frame 130 via a pair of parallel flexible members 105 and 106. Members 105 and 106 permit translational movement of the yoke relative to the frame along the x axis and in a plane parallel to the that defined by the frame 130. The yoke 220 is resiliently biassed by members 105 and 106 towards an equilibrium position central to a range of travel within the frame 130. Members 105 and 106 are flexible for movement in the plane defined by the frame 130 but inflexible in directions extending out of the plane defined by the frame 130 so that movement of yoke 220 out of the plane defined by the frame 130 is inhibited. The substrate 210 is secured to the yoke 220 by a pair of parallel flexible members 107 and 108. Members 107 and 108 permit translational movement of the substrate 210 relative to the yoke 220 along the y axis and in a plane parallel to the that defined by the frame 130. The substrate 210 is resiliently biased by members 107 and 108 towards an equilibrium position central to a range of travel defined by the yoke 220 and the frame 130. Members 107 and 108 are flexible for movement in the plane defined by the frame 130 but inflexible in directions extending out of the plane defined by the frame 130 so that movement of shuttle 121 out of the plane defined by the frame 130 is inhibited.

Shuttle 121 is coupled to the substrate 210 via a lever 241 and struts 251 and 252. Similarly, shuttle 122 is coupled to the substrate 210 via a lever 242 and struts 253 and 254. Lever 241 is pivotable about a fulcrum 232 secured to the frame 130. A pair of resiliently flexible members 261 and 262 define the position of fulcrum 232 relative to the frame 130. Likewise, lever 242 is pivotable about a fulcrum 231 secured to the frame 130. A pair of resiliently flexible members 263 and 264 define the position of fulcrum 231 relative to the frame 130. Members 101-108, struts 251-254, and members 261-264 are substantially resistant to tensile expansion and compression. However, members 261-264 are resiliently deformable to facilitate pivoting of the corresponding levers 241 and 242 about the corresponding fulcrums 231 and 232.

In operation, displacement of shuttle 121 upon actuation of drive unit 202 is transmitted to lever 241 by strut 251. Members 101 and 102 flex in the plane defined by the frame 130 to accommodate such a displacement. Lever 241 pivots about fulcrum 232 in response to such a displacement. The translational displacement of shuttle 121 relative to the frame 130 is thus translated into a rotational displacement of lever 241. The rotational displacement of lever 241 is in turn communicated to the substrate 210 by strut 252. Specifically, strut 252 pulls or pushes the substrate 210 depending on the direction of displacement of shuttle 121 relative to the frame 130. The substrate 210 is thus displaced relative to the yoke 220 in the direction of the y axis in response to displacement of shuttle 121. Members 107 and 108 flex in the plane defined by the frame 130 to accommodate such a displacement.

In operation, displacement of shuttle 122 upon actuation of drive unit 201 is transmitted to lever 242 by strut 254. Members 103 and 104 flex in the plane defined by the frame 130 to accommodate such a displacement. Lever 242 pivots about fulcrum 231 in response to such a displacement. The translational displacement of shuttle 122 relative to the frame is thus translated into a rotational displacement of lever 242. The rotational displacement of lever 242 is in turn communicated to the substrate 210 by strut 253. Specifically, strut 253 pulls or pushes the substrate 210 depending on the direction of displacement of shuttle 122 relative to the frame 130. Pushing and pulling forces imposed on the substrate 210 via strut 253 are communicated to the yoke 220 via members 107 and 108. The yoke 220 and substrate 210 are thus displaced in the direction of the x axis relative to the frame 130 in response to displacement of shuttle 121. Members 105 and 106 flex in the plane defined by the frame 130 to accommodate such a displacement.

The yoke 220 permits independent movement of the substrate 220 relative to the frame 130 in orthogonal directions parallel to the plane defined by the frame 130 under the control of the drive units 201 and 202. This enables the storage surface 70 disposed on the substrate 210 to be moved relative to the array thereby facilitating the tips of the array to be scanned over the storage surface as hereinbefore described. It will be appreciated that when shuttle 121 moves in one direction along the y axis, the corresponding movement of the substrate 210 along the y axis is in the opposite direction. Likewise, when shuttle 122 moves in one direction along the x axis is in one direction, the corresponding movement of the substrate along the x axis is in the other direction.

Shuttle 121, substrate 210, lever 241, fulcrum 232, and connecting struts 251 and 252 collectively form a balance resistant to translational shocks in the direction of the y axis. Specifically, the mass of shuttle 121 is selected relative to the mass of the substrate 210 and the position of fulcrum 232 along the length of lever 241 such that the turning moment imposed by shuttle 121 about fulcrum 232 is balanced by the turning moment imposed by the substrate 210 about fulcrum 232.

Similarly, shuttle 122, substrate 210, yoke 220, lever 242, fulcrum 231, and connecting struts 253 and 254 collectively form a balance resistant to translational shocks in the direction of the x axis. Specifically, the mass of shuttle 122 is selected relative to position of fulcrum 231 along the length of lever 242 and the collective mass of the yoke 220 and the substrate 210 in combination such that turning moment imposed by shuttle 122 about fulcrum 231 is balanced by the turning moment imposed by the combination of the substrate 210 and the yoke 220 about fulcrum 231.

It will be appreciated then that shuffle 122 may be more massive than shuttle 121 to compensate for the combined mass of the substrate 210 and the yoke 220. Alternatively, the position of fulcrum 231 relative to lever 242 may be different from the position of fulcrum 232 relative to lever 241 to achieve a balance in turning moments where it is desirable for shuttle 121 to have a mass similar to that of shuttle 122.

The balance in turning moments between shuttle 121 and the substrate 210 reduces the sensitivity of the device to translational shocks in the direction of the y axis. Shocks applied to the substrate 210 along the y axis are counterbalanced by shuttle 121 via lever 241 and vice versa. More specifically, if an impulsive translational force is applied to the device along the y axis in either direction, then both shuttle 121 and the substrate 210 will be accelerated in the same direction. However, the resultant torques exerted by shuttle 121 and the substrate 210 on fulcrum 232 oppose each other and hence cancel out if the turning moment of shuttle 121 relative to fulcrum 232 is substantially equal to the turning moment of the substrate 210 relative to fulcrum 232.

Likewise, the balance in turning moments between shuttle 121 and the yoke 220 carrying the substrate 210 reduces the sensitivity of the device to translational shocks in the direction of the x axis. Shocks applied to the yoke 220 and/or substrate 210 along the x axis are counterbalanced by shuttle 122 and vice versa. More specifically, if an impulsive translational force is applied to the device along the x axis in either direction, then both shuttle 122 and the substrate 210 and yoke 220 will be accelerated in the same direction. However, the resultant torques exerted by the shuttle 122 and the combination of the substrate 210 and yoke 220 on fulcrum 231 oppose each other and hence cancel out if the turning moment of shuttle 122 relative to fulcrum 231 is substantially equal to the turning moment of the substrate 210 and the yoke 220 relative to fulcrum 231.

It is desirable for the levers 241 and 242 to be of negligible mass relative to the masses of shuttle 121, shuttle 122, yoke 220, and substrate 210. It is also desirable for the turning moments of the ends of lever 241 alone about fulcrum 232 to cancel each other out in the event that an impulse force is applied along the x or y axis. Similarly it is desirable for the turning moments of the ends of lever 242 alone about fulcrum 231 to cancel each other out in the event that an impulse force is applied along the x or y axis. In particularly preferred embodiments of the present invention, the shape of levers 241 and 242 are selected so that their centres of mass are the corresponding ones of the fulcrums 231 and 232. This provides enhanced shock resistance.

Struts 251-254 permit levers 241 and 242, shuttles 121 and 122, yoke 220, and substrate 210 to be collapsed into close proximity to each other, thereby reducing the sensitivity of the device to rotational motion and shocks.

Figure 9:
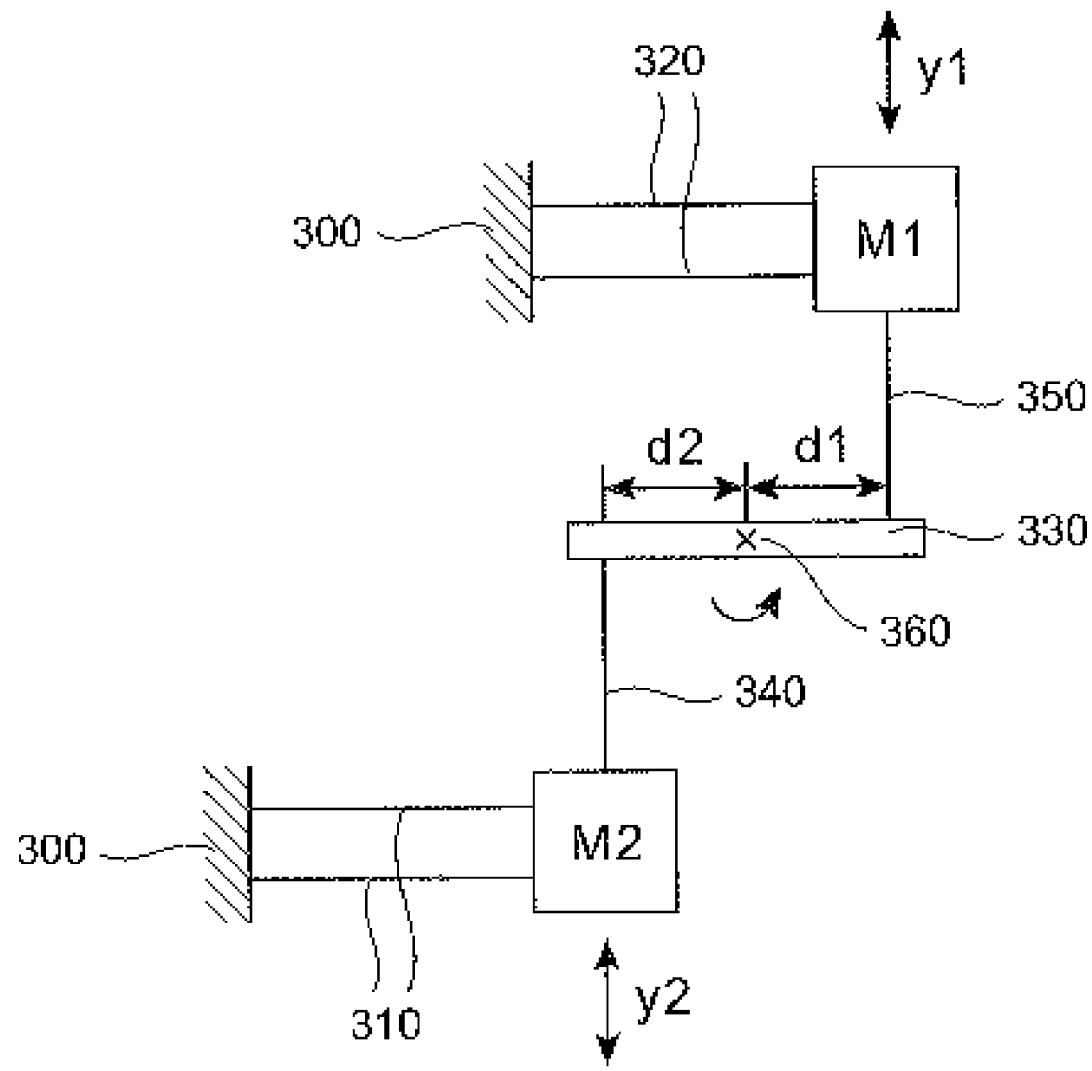
FIG. 9 is a simplified plan view of an example of a shock resistance system embodying the present invention.

By way of further explanation, a generalized balance system embodying the present invention will now be described with reference to FIG. 9. The generalized balance system comprises a lever 330 pivotable about a fulcrum 360 secured to a frame 300 and a pair of masses M1 and M2. M1 is connected to one end of the lever 330 via a strut 350. Similarly, M2 is connected to the other end of the lever 330 via a strut 340. M2 is connected to the lever 330 by strut 340 at a distance of d2 from the fulcrum 360. Similarly, M1 is connected to the lever 330 by strut 350 at a distance of d1 from the fulcrum. M1 is connected to the frame 300 via a pair of parallel resiliently biassed members 320. Similarly, M2 is connected to the frame 300 via a pair of parallel resiliently biassed members 310 of similar dimensions and properties to those of members 320. Each of the pairs of members 310 and 320 is flexible for bi-directional movement against the associated resilient bias in a plane perpendicular to the rotational axis of the fulcrum 340 and inflexible to movements out of such a plane. M1 and M2 are therefore free for bi-directional translational movement along parallel axes y1 and y2 respectively in a plane perpendicular to the rotational axis of the fulcrum against the collective resilient bias imposed by members 310 and 320. It will be appreciated that M1, M2, lever 330, members 310 and 320, and struts 340 and 350 may be coplanar in the interests of minimizing thickness of the balance system.

If the masses of lever 330, strut 340, and strut 350 are individually and collectively negligible in comparison with both mass M1 and mass M2 individually, then the system is balanced when the turning moment associated with M1 about the fulcrum 360 is equal to the turning moment associated with M2 about the fulcrum, such that:

$$M1d1 = M2d2 \quad (1)$$

Thus, an impulsive translational force applied to the system in either of the two directions parallel to axes y1 or y2 accelerates the masses M1 and M2 in the same direction. However, the resultant torques exerted by the masses M1 and M2 on fulcrum 360 oppose each other. If the torques are equal in magnitude, which is the case where the equation (1) is satisfied, then they cancel each other so that there is no displacement of masses M1 and M2 relative to the frame 300. However, if a translational force is applied to only one of masses M1 and M2 only, via a positioning actuator such as a piezoelectric transducer or an electromagnetic drive unit as hereinbefore described for example, then the applied force is communicated to the other of masses M1 and M2 via the lever 330 and the two masses are accelerated in opposite directions. Thus, both masses M1 and M2 are displaced with respect to the frame 300 in opposite directions.

As demonstrated earlier with reference to FIG. 8, the general system hereinbefore described with reference to FIG. 9 can be employed to provide shock resistance in devices having an element mounted for controlled movement in a orthogonal directions contained in a common plane. In the embodiment of the present invention hereinbefore described with reference to FIG. 8, there is provided a substrate 210 moveable in two orthogonal directions within a plane defined by a frame 130 and a pair of shuttles 121 and 122 each counterbalancing the substrate in a corresponding one of the two directions. However, the present invention is not limited to such arrangements. For example, referring to FIG. 10, in another embodiment of the present invention, there is provided a local probe storage device comprising four shuttles 400-430 each coupled to the substrate 210 via a corresponding one of four levers 440-470. Each of levers 440-470 is pivotable about a corresponding one of four fulcrums 480-510 secured to the frame 130. Shown in phantom is the yoke 220 to which the substrate 210 is connected via parallel resilient bias members 520 and 530 and to which the frame 130 is connected via parallel resilient bias members 540 and 550. As hereinbefore described, the bias members 520-550 permit movement against a bias of the substrate 210 within a plane defined by the frame in orthogonal directions x and y but prevent movement of the shuttle out of the plane. Each of the fulcrum 480-510 is centrally disposed on the corresponding one of the levers 440-470 relative to the connections to the corresponding one of the shuttle 400-430 and the centrally disposed substrate 210. Thus, if the substrate 210 is of mass M and of shuttles 430 and 410 is of mass M/2, then the device is balanced against and hence resistant to impulse forces applied along the x axis. Similarly, if the shuttles 400 and 420 are also of M/2, the device is balanced against and hence resistant to impulse forces applied along the y axis. Additionally, because the device is symmetrical in terms of distribution of masses, the sensitivity of the device to rotational motion and shocks is minimized.

Figure 10:
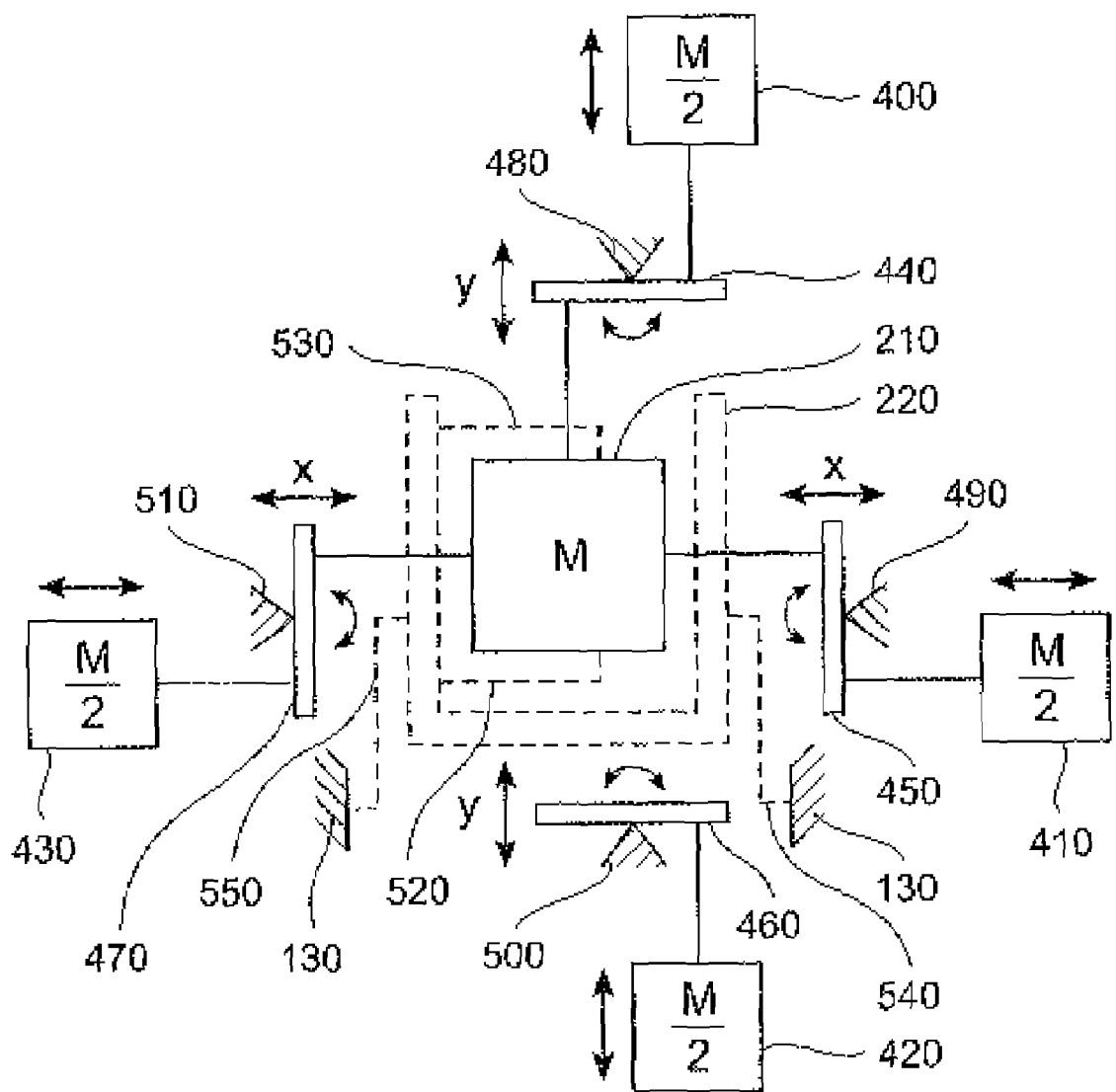
FIG. 10 is a simplified plan view of part of another example of a local probe storage device embodying the present invention.
Figure 11:
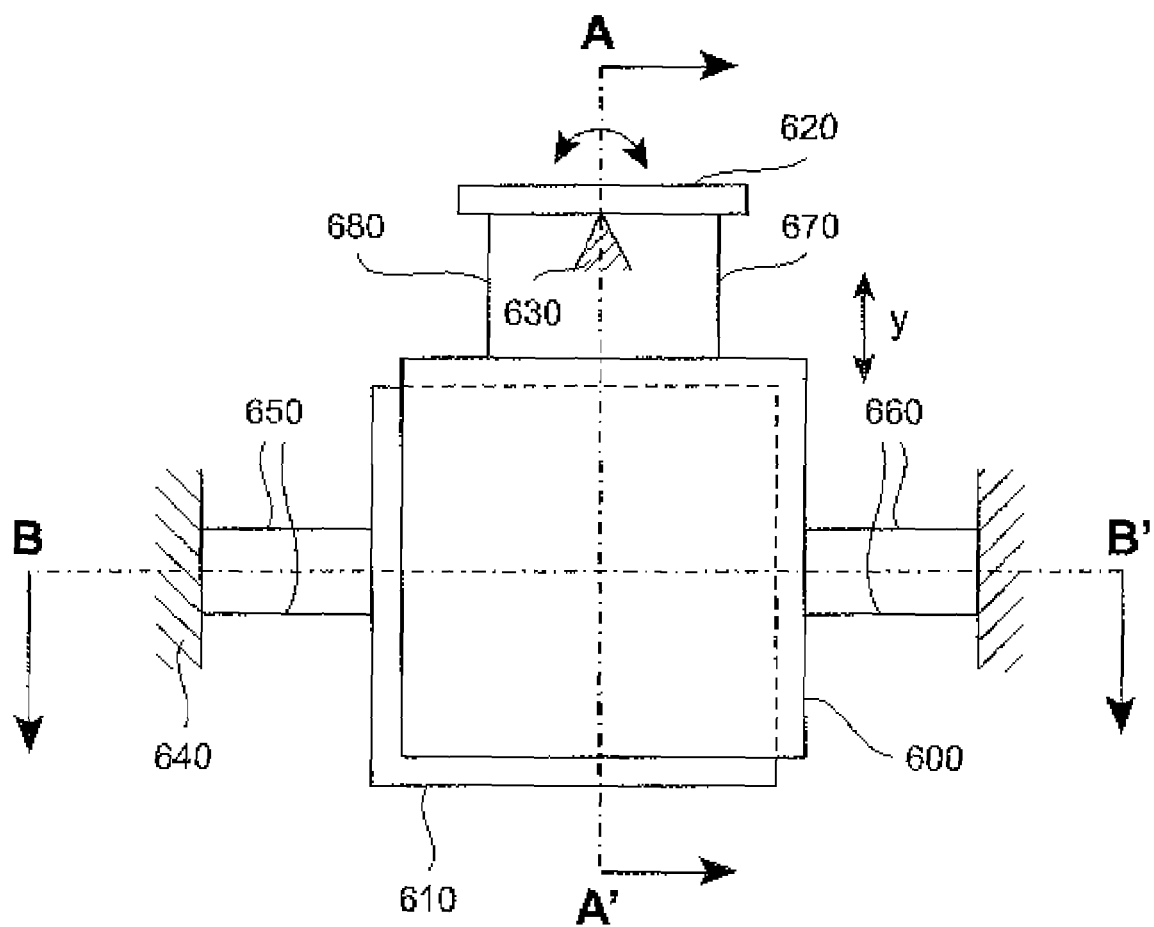
FIG. 11 is a simplified plan view of another example of a shock resistance system embodying the present invention.
Figure 12:
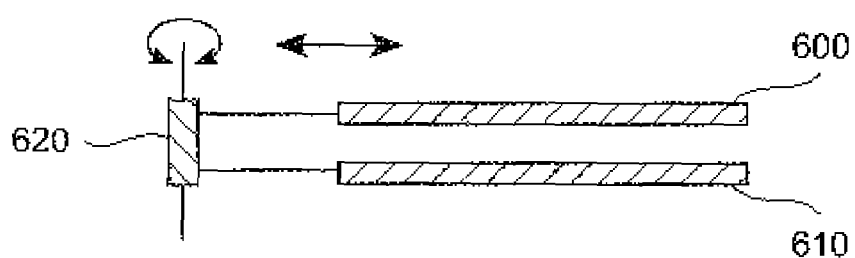
FIG. 12 is a cross sectional view of the system shown in FIG. 11 when viewed along line A-A' in the direction of the arrows.
Figure 13:
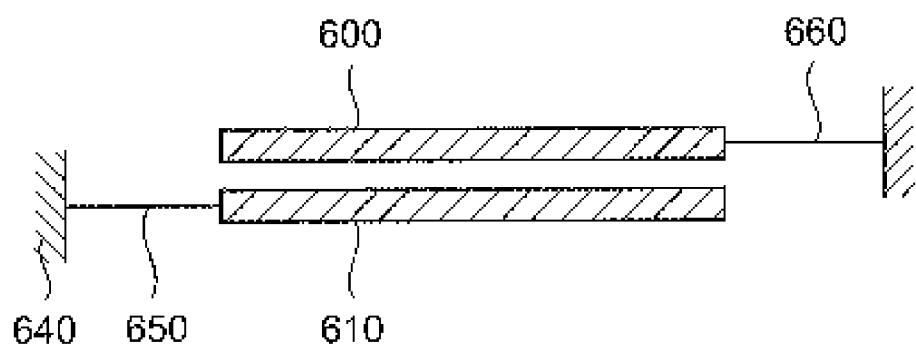
FIG. 13 is a cross sectional view of the system shown in FIG. 11 when viewed along line B-B' in the direction of the arrows; and, FIG. 14 is a simplified plan view of part of yet another example of a local probe storage device embodying the present invention.

In the embodiments of the present invention hereinbefore described with reference to FIGS. 8, 9, and 10, the masses are coplanar in the interests of minimizing thickness. However, the present invention is equally applicable to systems in which the masses are located in parallel planes. This advantageously permits the masses to be superposed on one another, thereby further reducing the sensitivity of such systems to rotational shocks and also reducing surface area. For example, referring to FIGS. 11, 12 and 13 in combination, an example of such a system embodying the present invention comprises a pair of masses 600 and 610 superposed on each other. Mass 610 is connected to a frame 640 via a pair of parallel resilient members 650. Similarly, mass 600 is connected to the frame via a second pair of resilient members 660. Operation of the pairs of resilient members 650 and 660 is substantially as hereinbefore described with reference to FIGS. 8, 9, 10. Mass 610 is connected via a strut 680 to one end of a lever 620 pivotable about a fulcrum 630 secured to the frame 640. Similarly, mass 600 is connected via a strut 670 to the other end of lever 620. In operation, an impulsive translational force applied to the system in a direction parallel to the y axis accelerates masses 600 and 610 in the same direction. However, the resultant torques exerted by masses 600 and 610 on fulcrum 630 oppose each other. If the torques are equal in magnitude, which is the case where the equation (1) is satisfied, then they cancel each other so that there is no displacement of masses 600 and 610 relative to the frame 640. However, if a translational force is applied to only one of masses 600 and 610 only, then the applied force is communicated to the other of masses 600 and 610 via the lever 620 and the two masses 600 and 610 are accelerated in opposite directions. Thus, both masses 600 and 610 are displaced with respect to the frame 640 in opposite directions.

Figure 14:
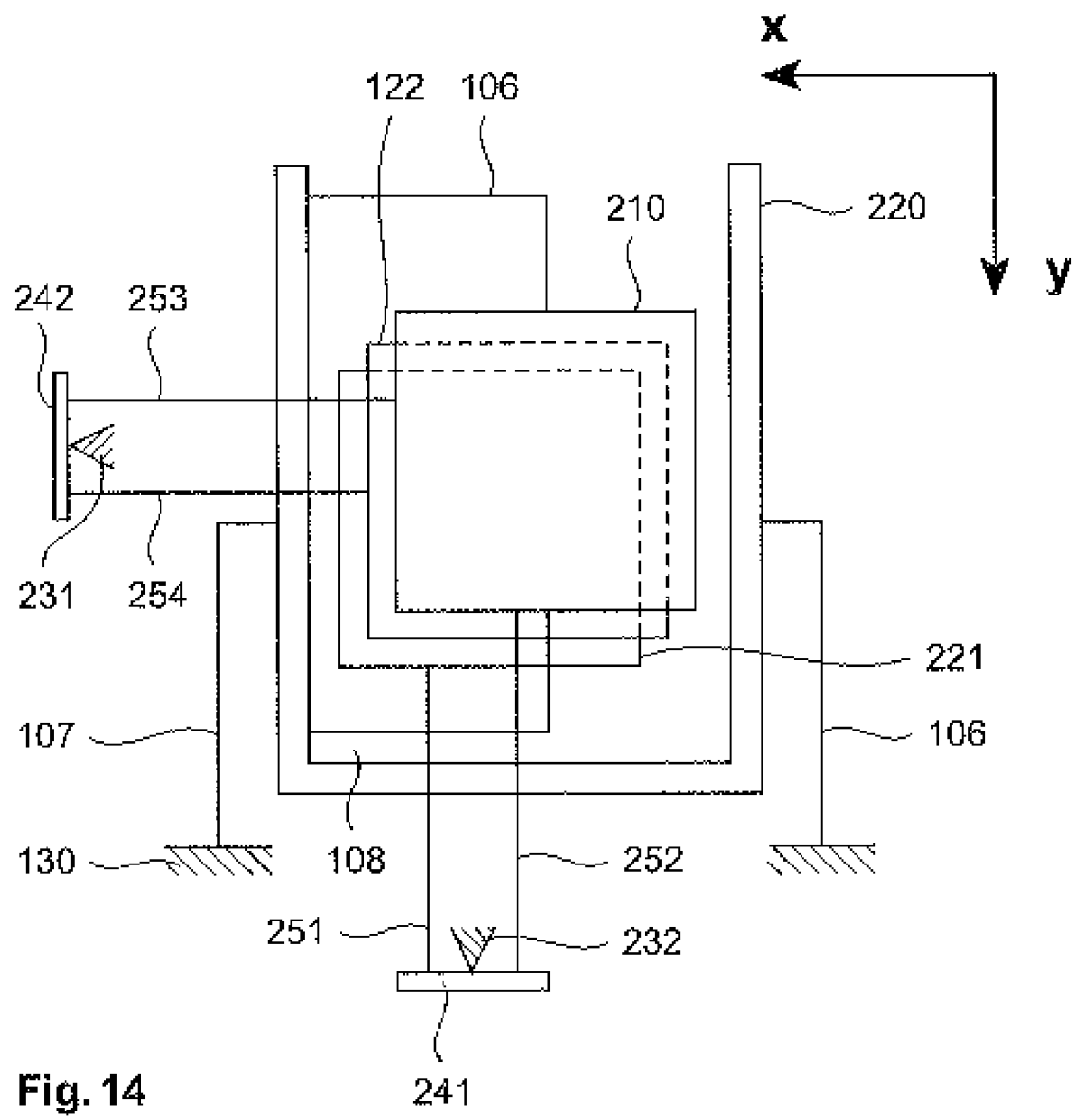

Referring now to FIG. 14, in a modification of the preferred embodiment of the present invention hereinbefore described with reference to FIG. 8, the substrate 210 and shuttles 121 and 122 are disposed in parallel planes superposed on one another. It will be appreciated that this arrangement operates substantially as hereinbefore described with reference to FIG. 11 along both the x and y axes. Again, by superposing the substrate 210 and shuttle 121 and 122m, the sensitivity of the device to rotational motion and shocks is reduced.

In the embodiments of the present invention hereinbefore described with reference to FIGS. 8, 10, and 14, the shuttles moveable along the x axis are coupled directly to the substrate. However, it will be appreciated that, in other embodiments of the of the present invention, the shuttles moveable along the x axis may be coupled to the substrate via the yoke. In the embodiment of the present invention hereinbefore described with reference to FIG. 8, 10, and 14, the storage surface 70 is located on the substrate 210. However, it will be appreciated that, in other embodiments of the present invention, the array may be located on the substrate 210. It will also be appreciated that the present invention is equally applicable to storage devices in which there is only one sensor scanned over a storage surface 70. Similarly, it will be appreciated that the present invention is also applicable to imaging systems in which one or more probes for detecting an image of a surface are scanned across the surface to be imaged.

What is claimed is:

1. Apparatus for reducing sensitivity of an article to mechanical shock, the apparatus comprising:
    a frame;
    first and second planar masses mounted in the frame for bi-directional movement relative to the frame along a first axis of displacement; and
    a first lever pivotable about a first fulcrum secured to the frame, the lever having one end connected to the first mass and the other end connected to the second mass, and the fulcrum being disposed between the ends of the lever;
    whereby the torque exerted about the fulcrum by the first mass is countered by the torque exerted about the fulcrum by the second mass in response to a mechanical shock applied to the frame along the axis of displacement such that an article carried by the first mass in use has reduced sensitivity to the shock, and
    wherein the second mass comprises an actuator element responsive to input stimulus for moving the second mass relative to the frame along the axis of displacement to produce a corresponding movement of the first mass relative to the frame along the axis of displacement.

2. Apparatus as claimed in claim 1, wherein the first and second masses are coplanar.

3. Apparatus as claimed in claim 1, wherein the first mass is disposed in a plane parallel to and displaced from the second mass.

4. Apparatus as claimed in claim 3, wherein the first and second masses at least partially overlap each other.

5. Apparatus as claimed in claim 1, wherein the actuator element comprises permanent magnet means having an axis of magnetization parallel to the axis of displacement and being cooperative with an electrically conductive coil mounted on the frame for generating a magnetic field coaxial with the axis of magnetization of the permanent magnet means in response to the input stimulus being an electrical current flow in the coil.

6. Apparatus as claimed in claim 5, wherein the permanent magnet means comprises a pair of permanent magnets disposed with like poles facing each other and the coil is disposed between the permanent magnets.

7. Apparatus as claimed in claim 1, further comprising:
    a third mass, the third mass and the first mass being mounted in the frame for bi-directional movement relative to the frame along a second axis of displacement in a plane defined by the frame and orthogonal to the first axis of displacement; and
    a second lever pivotable about a second fulcrum secured to the frame;
    the second lever having one end connected to the first mass and the other end connected to the third mass, and the second fulcrum being disposed between the ends of the second lever;
    whereby the torque exerted about the second fulcrum by the first mass is countered by the torque exerted about the second fulcrum by the third mass in response to a mechanical shock applied to the frame along the second axis of displacement.

8. Apparatus as claimed in claim 7, wherein the first, second, and third masses are coplanar.

9. Apparatus as claimed in claim 7, wherein the first, second, and third masses are each disposed in separate parallel planes each spaced from the others.

10. Apparatus as claimed in claim 9, wherein the first, second, and third masses at least partially overlap each other.

11. Apparatus as claimed in claim 7, wherein the second mass comprises a first actuator element responsive to input stimulus for moving the second mass relative to the frame along the first axis of displacement to produce a corresponding movement of the first mass relative to the frame along the first axis of displacement, and the third mass comprises a second actuator element responsive to input stimulus for moving the third mass relative to the frame along the second axis of displacement to produce a corresponding movement of the first mass relative to the frame along the second axis of displacement.

12. Apparatus as claimed in claim 11, wherein the first actuator element comprises first permanent magnet means having an axis of magnetization parallel to the first axis of displacement and being cooperative with a first electrically conductive coil mounted on the frame for generating a magnetic field coaxial with the axis of magnetization of the first permanent magnet means in response to the input stimulus being an electrical current flow in the first coil, and the second actuator element comprises second permanent magnet means having an axis of magnetization parallel to the second axis of displacement and being cooperative with a second electrically conductive coil mounted on the frame for generating a magnetic field coaxial with the axis of magnetization of the second permanent magnet means in response to the input stimulus being an electrical current flow in the second coil.

13. Apparatus as claimed in claim 12, wherein the first permanent magnet means comprises a pair of first permanent magnets disposed with like poles facing each other and the first coil is disposed between the first permanent magnets, and the second permanent magnet means comprises a pair of second permanent magnets disposed with like poles facing each other and the second coil is disposed between the second permanent magnets.

14. Apparatus as claimed in claim 7, further comprising:
a fourth planar mass mounted in the frame for bi-directional movement relative to the frame along the first axis of displacement;
a third lever pivotable about a third fulcrum secured to the frame;
a fifth planar mass mounted in the frame for bi-directional movement relative to the frame along the second axis of displacement; and
a fourth lever pivotable about a fourth fulcrum secured to the frame, the third lever having one end connected to the first mass and the other end connected to the fourth mass, and the third fulcrum being disposed between the ends of the third lever, the fourth lever having one end connected to the first mass and the other end connected to the fifth mass, and the fourth fulcrum being disposed between the ends of the fourth lever;
whereby the torque exerted about the third fulcrum by the first mass is countered by the torque exerted about the third fulcrum by the fourth mass in response to a mechanical shock applied to the frame along the first axis of displacement; and
whereby the torque exerted about the fourth fulcrum by the first mass is countered by the torque exerted about the fourth fulcrum by the fifth mass in response to a mechanical shock applied to the frame along the second axis of displacement.

15. Apparatus as claimed in claim 14, wherein the first, second, third, fourth, and fifth masses are coplanar, the fourth mass being mounted in the frame on the side of the first mass remote from the second mass, and the fifth mass being mounted in the frame on the side of the first mass remote from the third mass.

16. Apparatus as claimed in claim 14, wherein the first, second, third, fourth, and fifth masses are each disposed in separate parallel planes each spaced from the others.

17. Apparatus as claimed in claim 16, wherein the first, second, third, fourth, and fifth masses at least partially overlap each other.

18. Apparatus as claimed in claim 4, wherein the second mass comprises a first actuator element responsive to input stimulus for moving the second mass relative to the frame along the first axis of displacement to produce a corresponding movement of the first mass relative to the frame along the first axis of displacement and the third mass comprises a second actuator element responsive to input stimulus for moving the third mass relative to the frame along the second axis of displacement to produce a corresponding movement of the first mass relative to the frame along the second axis of displacement.

19. Apparatus as claimed in claim 18, wherein the first actuator element comprises first permanent magnet means having an axis of magnetization parallel to the first axis of displacement and being cooperative with a first electrically conductive coil mounted on the frame for generating a magnetic field coaxial with the axis of magnetization of the first permanent magnet means in response to the input stimulus being an electrical current flow in the first coil, and the second actuator element comprises second permanent magnet means having an axis of magnetization parallel to the second axis of displacement and being cooperative with a second electrically conductive coil mounted on the frame for generating a magnetic field coaxial with the axis of magnetization of the second permanent magnet means in response to the input stimulus being an electrical current flow in the second coil.

20. Apparatus as claimed in claim 19, wherein the first permanent magnet means comprises a pair of first permanent magnets disposed with like poles facing each other and the first coil is disposed between the first permanent magnets, and the second permanent magnet means comprises a pair of second permanent magnets disposed with like poles facing each other and the second coil is disposed between the second permanent magnets.

21. Apparatus as claimed in claim 20, wherein the fourth mass comprises a third actuator element responsive to input stimulus for moving the fourth mass relative to the frame along the first axis of displacement to produce a corresponding movement of the first mass relative to the frame along the first axis of displacement and the fifth mass comprises a fourth actuator element responsive to input stimulus for moving the fifth mass relative to the frame along the second axis of displacement to produce a corresponding movement of the first mass relative to the frame along the second axis of displacement.

22. Apparatus as claimed in claim 21, wherein the third actuator element comprises third permanent magnet means having an axis of magnetization parallel to the first axis of displacement and being cooperative with a third electrically conductive coil mounted on the frame for generating a magnetic field coaxial with the axis of magnetization of the third permanent magnet means in response to the input stimulus being an electrical current flow in the third coil, and the fourth actuator element comprises fourth permanent magnet means having an axis of magnetization parallel to the second axis of displacement and being cooperative with a fourth electrically conductive coil mounted on the frame for generating a magnetic field coaxial with the axis of magnetization of the fourth permanent magnet means in response to the input stimulus being an electrical current flow in the fourth coil.

23. Apparatus as claimed in claim 22, wherein the third permanent magnet means comprises a pair of third permanent magnets disposed with like poles facing each other and the third coil is disposed between the third permanent magnets, and the fourth permanent magnet means comprises a pair of fourth permanent magnets disposed with like poles facing each other and the fourth coil is disposed between the fourth permanent magnets.

24. A local probe storage device comprising: a storage surface;
at least one probe for reading data from and/or writing data to the surface;
a scanner for moving the probe and surface relative to each other to scan the probe across the surface;
and an apparatus for reducing sensitivity of an article to mechanical shock, the apparatus comprising: a frame;
first and second planar masses mounted in the frame for bi-directional movement relative to the frame along a first axis of displacement;
a first lever pivotable about a first fulcrum secured to the frame;
the lever having one end connected to the first mass and the other end connected to the second mass, and the fulcrum being disposed between the ends of the lever;
whereby the torque exerted about the fulcrum by the first mass is countered by the torque exerted about the fulcrum by the second mass in response to a mechanical shock applied to the frame along the axis of displacement such that an article carried by the first mass in use has reduced sensitivity to the shock, said apparatus being coupled to the scanner and one of the storage surface and the or each probe for reducing sensitivity of said one of the storage surface and the or each probe to mechanical shock.

25. A device as claimed in claim 24, wherein the or each probe is carried by the first mass.

26. A device as claimed in claim 24, wherein the storage surface is carried by the first mass.

27. A device as claimed in claim 24, wherein said device is equipped with apparatus for reducing sensitivity of an article to mechanical shock, the apparatus comprising:
   a frame;
   first and second planar masses mounted in the frame for bi-directional movement relative to the frame along a first axis of displacement; and
   a first lever pivotable about a first fulcrum secured to the frame, the lever having one end connected to the first mass and the other end connected to the second mass, and the fulcrum being disposed between the ends of the lever;
   whereby the torque exerted about the fulcrum by the first mass is countered by the torque exerted about the fulcrum by the second mass in response to a mechanical shock applied to the frame along the axis of displacement such that an article carried by the first mass in use has reduced sensitivity to the shock, and wherein the second mass comprises an actuator element responsive to input stimulus for moving the second mass relative to the frame along the axis of displacement to produce a corresponding movement of the first mass relative to the frame along the axis of displacement.

28. A probe imaging system comprising: at least one probe for detecting an image of a surface;
   a scanner for moving the probe and surface relative to each other to scan the or each probe across the surface;
   and apparatus as claimed in claim 1 coupled to the scanner and one of the surface and the or each probe for reducing sensitivity of said one of the surface and the or each probe to mechanical shock.

29. A system as claimed in claim 28, wherein the or each probe is carried by the first mass.

30. A probe imaging system comprising: at least one probe for detecting an image of a surface;
   a scanner for moving the probe and surface relative to each other to scan the or each probe across the surface;
   and apparatus as claimed in claim 24, coupled to the scanner and one of the surface and the or each probe for reducing sensitivity of said one of the surface and the or each probe to mechanical shock.

* * * * *